(12) United States Patent
Tojima et al.

(10) Patent No.: US 9,315,107 B2
(45) Date of Patent: Apr. 19, 2016

(54) TRANSPORT VEHICLE EQUIPPED WITH CURRENT COLLECTOR

(75) Inventors: Masanori Tojima, Fujisawa (JP); Kouichi Yamashita, Yokohama (JP); Tsugio Sudou, Tokyo (JP); Koji Takeda, Tama (JP)

(73) Assignee: Komatsu Ltd., Tokyo (JP)

( * ) Notice: Subject to any disclaimer, the term of this patent is extended or adjusted under 35 U.S.C. 154(b) by 241 days.

(21) Appl. No.: 14/110,781

(22) PCT Filed: May 9, 2012

(86) PCT No.: PCT/JP2012/061916
§ 371 (c)(1),
(2), (4) Date: Oct. 9, 2013

(87) PCT Pub. No.: WO2012/153782
PCT Pub. Date: Nov. 15, 2012

(65) Prior Publication Data
US 2014/0027229 A1    Jan. 30, 2014

(30) Foreign Application Priority Data
May 10, 2011   (JP) ................................ 2011-105744

(51) Int. Cl.
*B60L 5/24*        (2006.01)
*B60M 7/00*        (2006.01)
(Continued)

(52) U.S. Cl.
CPC ................. *B60L 5/24* (2013.01); *B60L 3/0023* (2013.01); *B60L 9/04* (2013.01); *B60L 9/18* (2013.01);
(Continued)

(58) Field of Classification Search
CPC ............... B60L 5/20; B60L 5/18; B60L 5/22; B60L 5/24; B60L 5/26; B60L 5/28; B60L 5/00; B60L 2200/26; B60L 5/36; B60L 2200/36
USPC ....... 191/59.1, 33 R, 66, 59, 45 R, 50, 55, 87, 191/90
See application file for complete search history.

(56) References Cited

U.S. PATENT DOCUMENTS 3,529,103 A    9/1970   Wortman
4,700,023 A    10/1987  Hillmann et al.
(Continued)

FOREIGN PATENT DOCUMENTS

CN    86100737 A    10/1986
CN    1085169 A    4/1994
(Continued)

OTHER PUBLICATIONS

International Search Report dated Jun. 12, 2012, issued for PCT/JP2012/061916.
(Continued)

*Primary Examiner* — Mark Le
(74) *Attorney, Agent, or Firm* — Locke Lord LLP; James E. Armstrong, IV; Brian S Matross

(57) ABSTRACT

A transport vehicle equipped with a current collector, includes: a vessel to load a load; a current collector that extends to receive electric power from an overhead line and contracts and retracts so as to be disposed below the vessel; and a vehicle body that rotationally drives driving wheels by at least one of the electric power from the current collector and a self-propelled driving source and on which the vessel is placed.

5 Claims, 9 Drawing Sheets

(51) Int. Cl.
  *B60L 9/18*   (2006.01)
  *B60L 11/02*  (2006.01)
  *B60L 3/00*   (2006.01)
  *B60L 9/04*   (2006.01)
  *B60L 11/04*  (2006.01)

(52) U.S. Cl.
  CPC ............... *B60L 11/02* (2013.01); *B60L 11/04* (2013.01); *B60M 7/00* (2013.01); *B60L 2200/36* (2013.01); *B60L 2220/44* (2013.01); *B60L 2240/70* (2013.01); *B60L 2260/28* (2013.01); *Y02T 10/70* (2013.01); *Y02T 10/7077* (2013.01); *Y02T 10/7291* (2013.01); *Y02T 90/16* (2013.01)

(56) References Cited

U.S. PATENT DOCUMENTS

| | | | |
|---|---|---|---|
| 4,745,997 A | 5/1988 | Takei et al. | |
| 5,293,947 A | 3/1994 | Stratton | |
| 7,549,521 B2 * | 6/2009 | Aisenbrey | 191/29 DM |
| 2010/0114404 A1 * | 5/2010 | Donnelly | 701/2 |
| 2010/0121509 A1 | 5/2010 | Takeshima et al. | |

FOREIGN PATENT DOCUMENTS

| | | | |
|---|---|---|---|
| GB | 951133 | * | 3/1964 |
| JP | 48-30335 Y1 | | 9/1973 |
| JP | 57-125102 U | | 8/1982 |
| JP | 57-126202 A | | 8/1982 |
| JP | 58-179801 U | | 12/1983 |
| JP | 60-181104 U | | 12/1985 |
| JP | 63-035102 A | | 2/1988 |
| JP | 2001-078366 A | | 3/2001 |
| JP | 2002-067776 A | | 3/2002 |
| WO | WO-2010/121707 A1 | | 10/2010 |

OTHER PUBLICATIONS

Office Action mailed Jun. 4, 2014, issued for the Australian patent application No. 2012254486.

* cited by examiner

TRANSPORT VEHICLE EQUIPPED WITH CURRENT COLLECTOR

CROSS REFERENCE TO RELATED APPLICATIONS

This application is related to co-pending application: "TRANSPORT VEHICLE EQUIPPED WITH CURRENT COLLECTOR" filed even date herewith in the names of Masanori Tojima, Kouichi Yamashita, Tsugio Sudou and Koji Takeda as a national phase entry of PCT/JP2012/061917, which application is assigned to the assignee of the present application and is incorporated by reference herein.

FIELD

The present invention relates to a transport vehicle equipped with a current collector.

BACKGROUND

There is disclosed a transport vehicle of a trolley assist system, which travels under its own power by driving an electric motor with an electric power generated by an in-vehicle engine generator in a normal section, but, in some sections such as a sloping road, collects current from a trolley line (overhead line) suspended above the ground using a pantograph mounted on the vehicle so as to drive the electric motor by using the current instead of the power source of the engine generator (Patent Literature 1).

CITATION LIST

Patent Literature

Patent Literature 1: Unexamined Japanese Utility Model No. 60-181104

SUMMARY

Technical Problem

There is a concern that a pantograph (current collector) collides with loads falling from a vessel or a loading machine such as an excavator at the time of loading or unloading the loads such as an ore onto or from a transport vehicle, and thus there is the possibility of breakage of the pantograph. It is an object of the present invention to provide a transport vehicle equipped with a current collector that inhibits breakage of the current collector at the time of loading or unloading loads such as an ore onto or from the transport vehicle.

Solution to Problem

According to the present invention, a transport vehicle equipped with a current collector, comprises: a vessel to load a load; a current collector that extends to receive electric power from an overhead line and contracts and retracts so as to be disposed below the vessel; and a vehicle body that rotationally drives driving wheels by at least one of the electric power from the current collector and a self-propelled driving source and on which the vessel is placed.

According to the present invention, the contracted and retracted current collector is disposed on an inner side of an outline of the vessel when viewed from a top.

According to the present invention, the current collector is disposed at a front side and a rear side in a moving direction of the vehicle body.

According to the present invention, the vehicle body is an unmanned transport vehicle without a cab.

According to the present invention, the current collector includes a slider that slidably comes in contact with the overhead line, a first arm to which the slider is attached, and a second arm that is connected with the first arm using a joint and is contracted and retracted to be folded so as to accommodate the first arm.

The present invention can inhibit breakage of a current collector at the time of loading or unloading loads such as an ore onto or from a transport vehicle.

DESCRIPTION OF EMBODIMENTS

An embodiment of the present invention will be described in detail with reference to the drawings. The present invention is not limited by the contents described in the following embodiment. In addition, elements described below include those that are easily conceived by a person skilled in the art and that are substantially the same. Further, the elements described below can be properly combined. Furthermore, various omissions, displacements, modifications of the elements can be performed without departing from the scope of the present invention.

<Unmanned Dump Truck>

Figure 1:
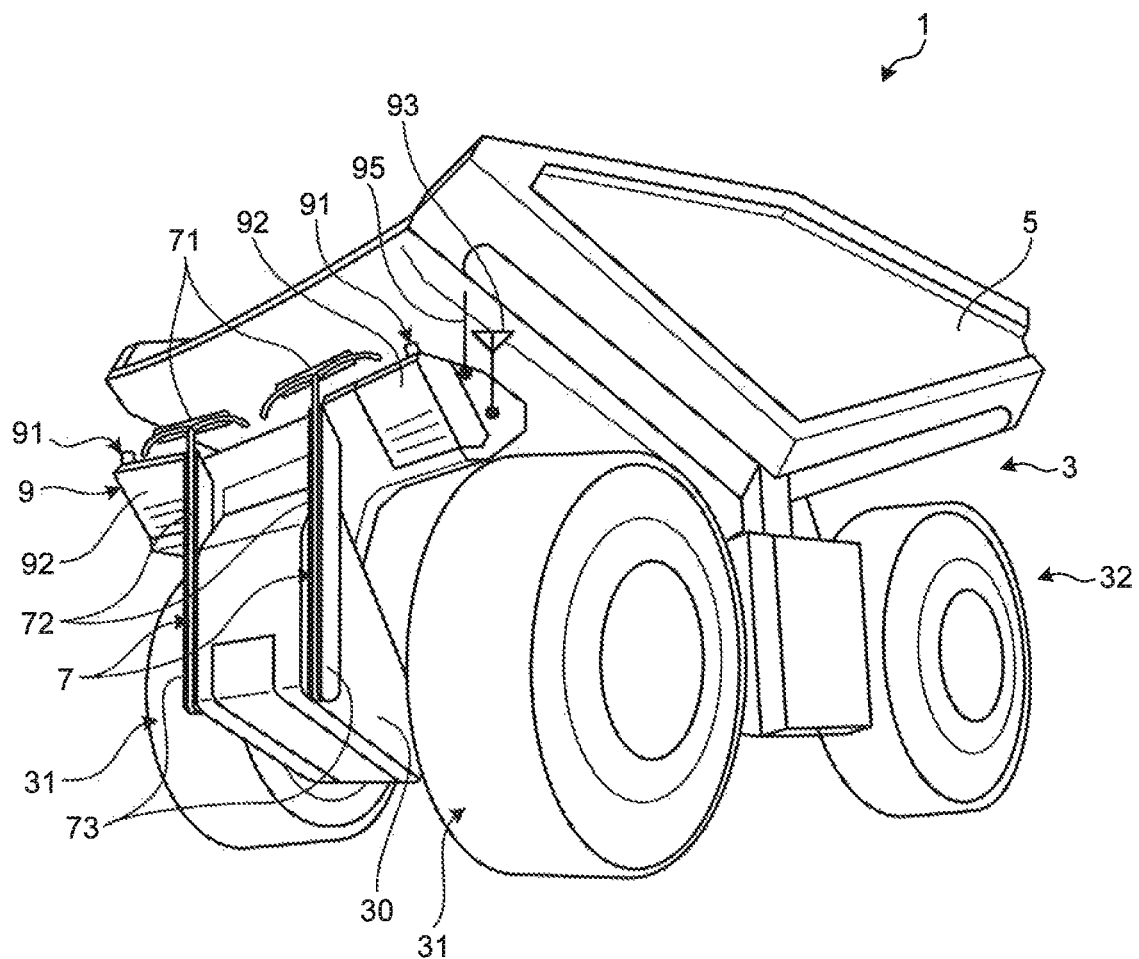
FIG. 1 is a perspective view illustrating a dump truck using a current collector according to the present embodiment.
Figure 2:
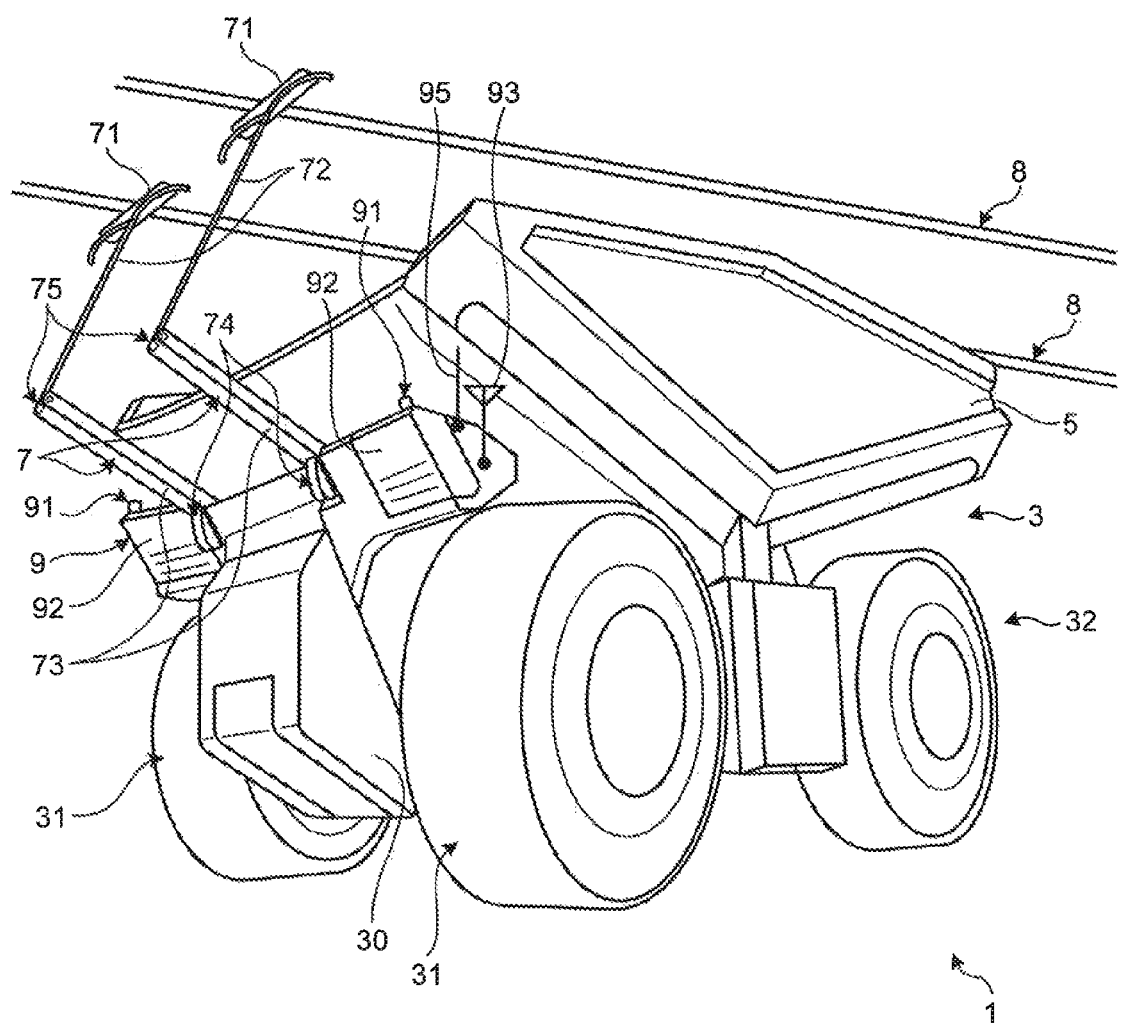
FIG. 2 is an explanatory diagram illustrating a stretched state of the current collector of FIG. 1.
Figure 3:
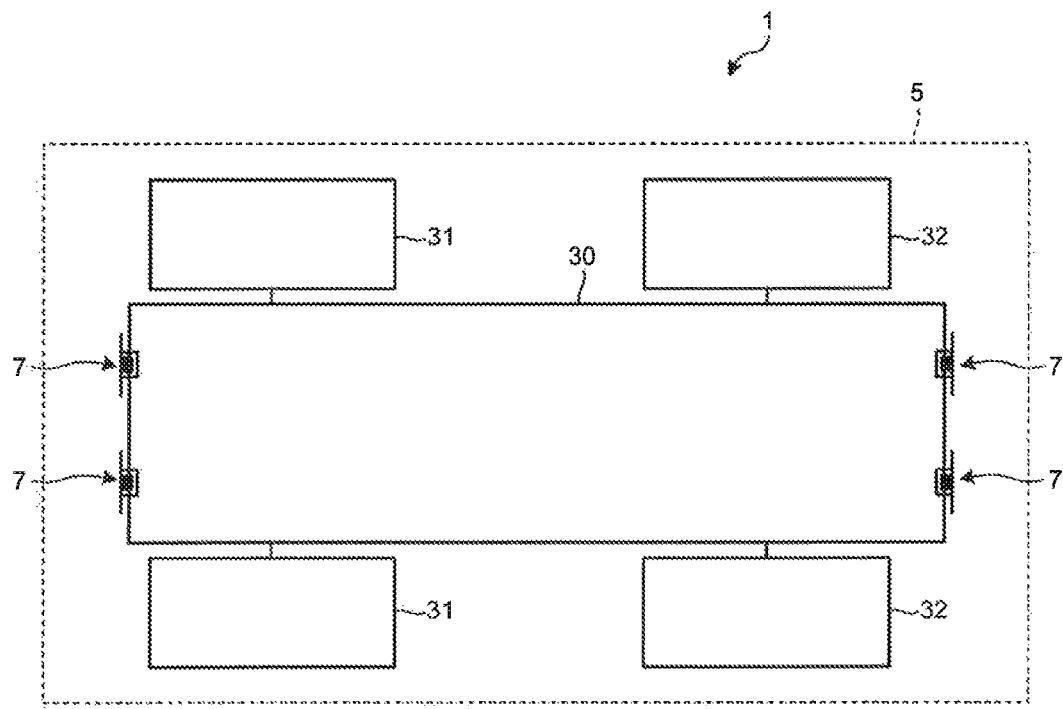
FIG. 3 is a top view of FIG. 1.

FIG. 1 is a perspective view illustrating a dump truck using a current collector according to the present embodiment. FIG. 2 is an explanatory diagram illustrating a stretched state of the current collector of FIG. 1. FIG. 3 is a top view of FIG. 1. A dump truck 1 is a transport vehicle equipped with current collector of so-called trolley assist system by driving an electric motor with an electric power fed by the current collector to rotationally drive driving wheels in an overhead line section.

The dump truck 1 is a transport vehicle equipped with current collector including a vehicle body 3 that includes wheels 31, driving wheels 32, and a chassis 30, a vessel 5 placed on the chassis 30 of the vehicle body 3, a pantograph 7, and an input/output device group 9. In addition, the dump truck 1 is an unmanned dump truck that travels as an unmanned transport vehicle which is not equipment with a cab. The vehicle body 3 is a hybrid vehicle, which generates power by using a fuel and also generates the power by using the electric power. The vehicle body 3 makes a travelling possible by transmitting the generated power to the driving wheels 32. The wheels 31 and the driving wheels 32 are attached to the chassis 30. The dump truck 1 is used in, for example, a mine or the like.

The vessel 5 is a loading platform for loading loads and is disposed on the chassis 30 of the vehicle body 3. On the vessel 5, as the loads, unloading earth such as an ore, rock, or soil is loaded. The vessel 5 is tilted by a hydraulic cylinder and may thus discharge the loaded loads. Further, the vessel 5 may be a detachable configuration with respect to the chassis 30 of the vehicle body 3.

The pantograph 7 is a current collector for receiving the electric power from an overhead line 8. For example, the pantograph 7 includes a slider 71, a first arm 72, a second arm 73, a pantograph control actuator 74, and a pantograph joint 75. In the dump truck 1 according to the present embodiment, since two overhead lines 8 are presented, two pantographs 7 are provided.

The slider 71 is attached to an end of the first arm 72 and is a current collecting member for receiving the electric power from the overhead line 8 by slidably coming in contact with the overhead line 8. The first arm 72 and the second arm 73 are connected to each other using the pantograph joint 75 and have a joint structure which can follow the change in a height of the overhead line 8. The second arm 73 is attached to the pantograph control actuator 74.

The pantograph 7 is stretched by the operation of the pantograph control actuator 74 and then is capable of receiving the electric power from the overhead line 8. In addition, the pantograph 7 is contracted and retracted to be folded by the operation of the pantograph control actuator 74 and then is stored below the vessel 5. The contracted and retracted pantograph 7 is disposed on an inner side of a dotted line illustrating an outline of the vessel 5 illustrated in FIG. 3 when viewed from the top. Thus, in a case of loading or unloading the loads, such as the ore, onto or from the vessel 5, the contracted and retracted pantograph 7 is covered with the vessel 5. In other words, the contracted and retracted pantograph 7 is in a state in which the contracted and retracted pantograph is hidden in the vessel 5 when viewed from the top.

Therefore, it is possible to reduce the possibility that the loads fall from the vessel 5 and come in contact with the pantograph 7. Further, since the pantograph 7 is covered with the vessel 5, in a loading area to be described later, the possibility that a loading machine such as an excavator, which is used for loading the loads such as the ore on the vessel 5, collides with the pantograph 7 is reduced. As a result, it is possible to reduce the possibility that the damage occurs in the pantograph 7. In addition, the dump truck 1 mostly runs on outdoors or parks in the outdoors. The dump truck 1 can inhibit effects caused by rain or the like on the pantograph 7, since the contracted and retracted pantograph 7 is hidden in the vessel 5 when viewed from the top. As a result, the dump truck 1 can reduce the risk of failure of the pantograph 7. Further, the dump truck 1 has no cab, and the vessel 5 can cover the vehicle body 3. Therefore, the vessel 5 is substitutive for a hangar. As a result, it is also possible to reduce the possibility that the vehicle body 3 is likely to be failed.

Preferably, the pantograph 7 has a structure in which the first arm 72 is folded in the second arm 73. The second arm 73 has a concave portion and the first arm 72 may be accommodated in the concave portion. For this reason, the protrusion of the pantograph 7 becomes less at the time of storing the pantograph 7. In addition, since the dump truck 1 has no cab, it is easy to secure a region for storing the pantograph 7 below the vessel 5.

The pantograph 7 is arranged on at least a front side in a moving direction of the chassis 30. Further, more preferably, the pantograph 7 is also arranged on a rear side of the moving direction of the chassis 30. That is, the pantograph 7 is disposed on both sides of the vehicle body 3 in a direction parallel to the moving direction of the vehicle body 3. Thus, when the vehicle body 3 travels along a sloping road, it is possible to stretch the pantograph 7 of an inclined upper side of the sloping road and then to receive the electric power from the overhead line 8 without the operation of reversing the vehicle body 3. As a result, even if the loads fall from the vessel 5 because of an inclination of the sloping load, the possibility that the loads collide with the pantograph 7 is reduced. Furthermore, the pantograph 7 may be disposed on at least one side of the vehicle body 3 in a direction perpendicular to the moving direction of the vehicle body 3, and preferably, may be disposed on both sides thereof, respectively.

The input/output device group 9 is provided with a pantograph position detector 91 which detects a position of the pantograph 7, an obstacle detector 92 which detects obstacles on the traveling path of the vehicle body 3, a vehicle body position measuring device 95 which measures a present position of the vehicle body 3, and a communication device 93 which performs a radio communication with a central management control equipment to be described later.

The pantograph position detector 91 is an image pickup device, for example, such as a camera. Alternatively, the pantograph position detector 91 may be a laser positioning device or an ultrasonic positioning device. It is preferable to be disposed at a plurality of positions with predetermined intervals. Thus, it is possible to grasp a contact state of the slider 71 of the pantograph 7 with the overhead line 8.

The obstacle detector 92 is, for example, a millimeter-wave radar device and may detect the position of the obstacle by transmitting a radio wave of a millimeter waveband and receiving a reflective wave reflected from the obstacle. The vehicle body position measuring device 95 is a position measuring device such as a Global Positioning System (GPS).

The dump truck 1 stores traveling path information which holds information on the moving direction or speed on map information in a memory within a control device to be described later. The dump truck 1 determines the moving direction or the speed based on the traveling path information and the present position information obtained from the vehicle body position measuring device 95 and then travels. In addition, the dump truck 1 may also be autonomous unmanned dump capable of determining independently a traveling condition based on information of the input/output device group 9.

<Self-Propelled Driving Source>

Figure 4:
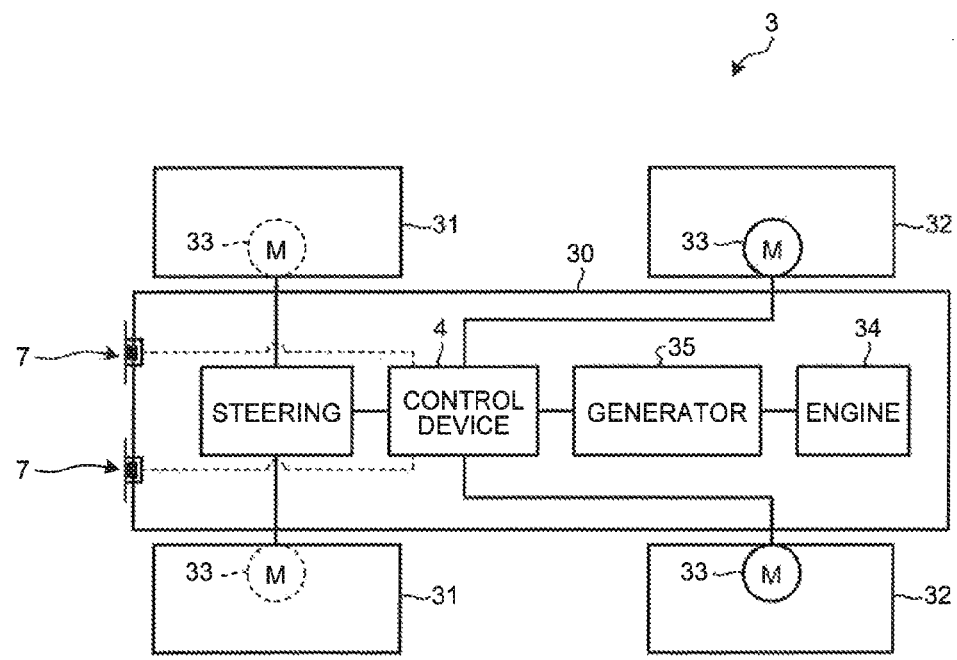
FIG. 4 is an explanatory diagram illustrating an example of a self-propelled driving source of the dump truck according to the present embodiment.

FIG. 4 is an explanatory diagram illustrating an example of a self-propelled driving source of the dump truck according to the present embodiment. As illustrated in FIG. 4, the vehicle body 3 includes a control device 4, a generator 35, an engine 34 serving as internal-combustion engine, a steering 36, and a motor 33 on the chassis 30. Further, the generator 35 is connected to the engine 34 and is the self-propelled driving source for generating the electric power by power of the engine 34.

In addition, the control device 4 transfers the electric power generated from the generator 35 to the motor 33 and the steering 36. The motor 33 is an in-wheel motor disposed within the driving wheel 32. Further, the motor 33 is also disposed in the wheel 31 so that the wheel 31 serves as the driving wheel, and thus the vehicle body 3 may become four-wheel-drive.

The steering 36 includes, for example, an electric motor and steers the direction of the wheel 31 in accordance with the control of the control device 4 addition, the control device 4 transfers the electric power from the above-described pantograph 7 to the motor 33 and the steering 36. The control device 4 causes the vehicle body 3 to travel independently by supplying the electric power generated from the generator 35 to the motor 33.

In addition, the control device collects the current from the overhead line 8 by the pantograph 7 and supplies the electric power to the motor 33 from the pantograph 7 in place of the generator 35 to cause the traveling of the vehicle body 3. Moreover, the control device 4 collects the current from the overhead line 8 by the pantograph 7 and supplies the electric power from the pantograph 7 together with the electric power of the generator 35 to the motor 33 to cause the traveling of the vehicle body 3.

<Control of Dump Truck>

Figure 5:
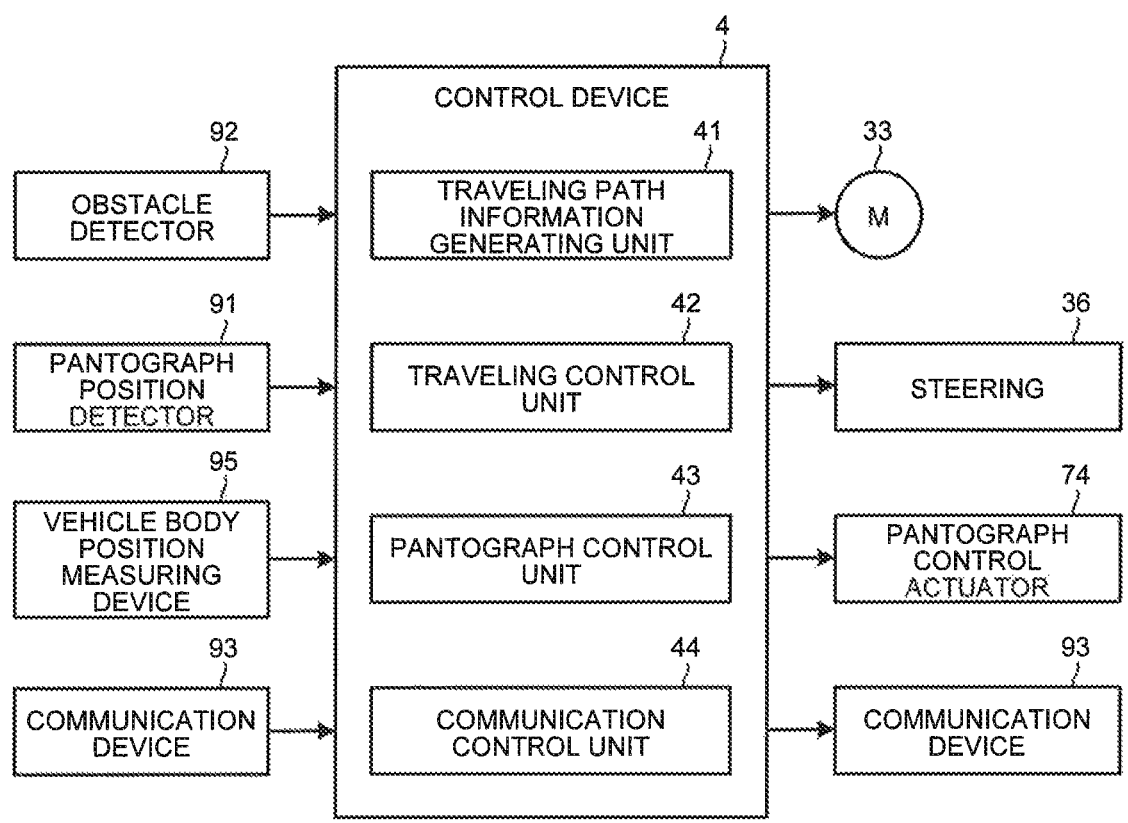
FIG. 5 is an explanatory diagram illustrating an example of a control block of the dump truck according to the present embodiment.
Figure 6:
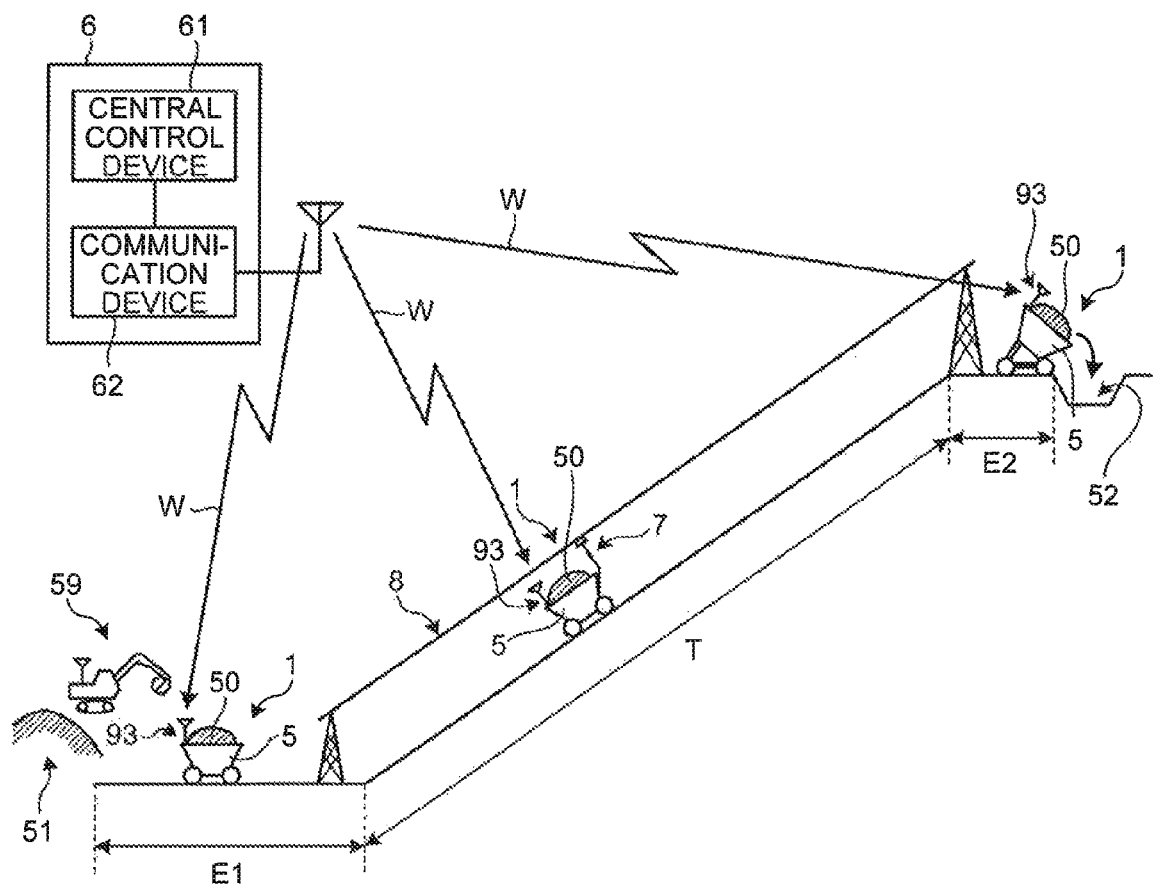
FIG. 6 is an explanatory diagram illustrating an example of a travelling path of the dump truck according to the present embodiment.
Figure 7:
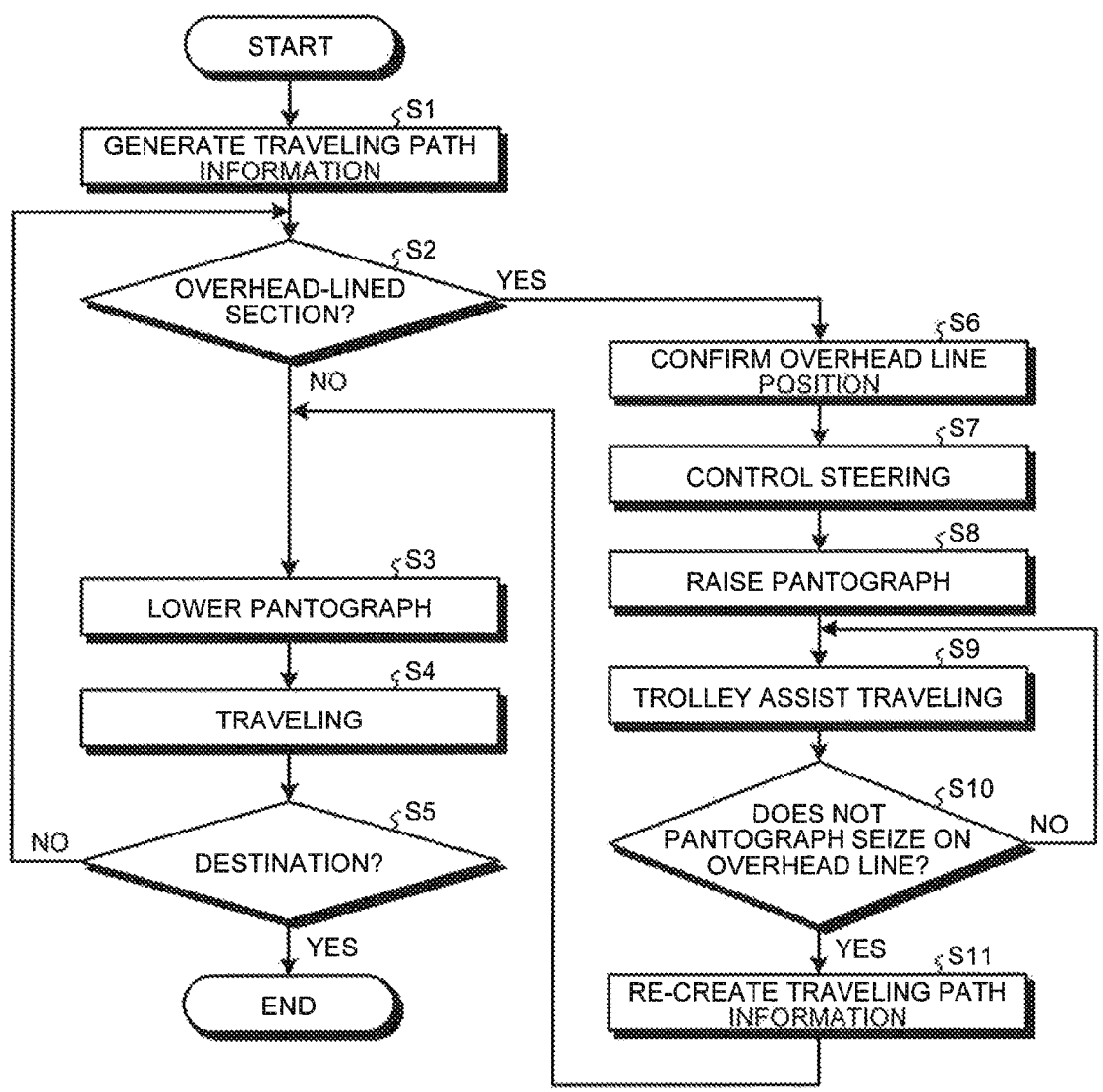
FIG. 7 is a flowchart illustrating an example of a control procedure of the dump truck according to the present embodiment.
Figure 8:
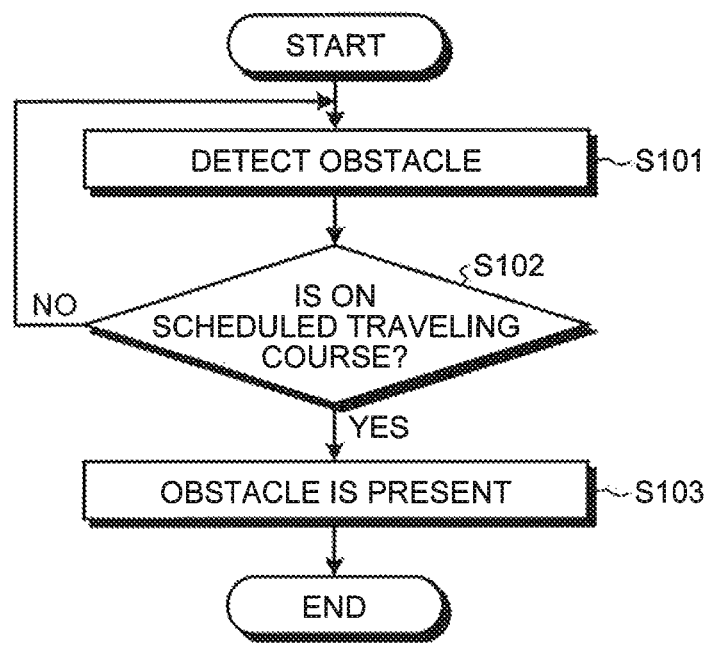
FIG. 8 is a flowchart illustrating an example of a control procedure of the dump truck according to the present embodiment.

FIG. 5 is an explanatory diagram illustrating an example of a control block of the dump truck according to the present embodiment. FIG. 6 is an explanatory diagram illustrating an example of the traveling path of the dump truck according to the present embodiment. FIGS. 7 and 8 are flowcharts illustrating an example of a control procedure of the dump truck according to the present embodiment. The control device 4 is connected to the pantograph position detector 91, the obstacle detector 92, the vehicle body position measuring device 95, the communication device 93, the motor 33, the steering 36, and the pantograph control actuator 74. The control device 4 is a computer system including a CPU (Central Processing Unit) and memory. The control device 4 includes a traveling path information generating unit 41, a traveling control unit 42, a pantograph control unit 43, and a communication control unit 44.

The traveling path of the dump truck 1 illustrated in FIG. 6 has, for example, an overhead-lined section T in which the overhead line 8 is laid and self-propelled sections E1 and E2 in which the overhead line is not laid. For example, the dump truck 1 is shipped with loads 50 by a loading machine 59 at a loading area 51.

The dump truck 1 travels freely along the self-propelled section 12 and reaches the overhead-line section T. The dump truck 1 stretches the pantograph 7 of the inclined upper side of the sloping road in the overhead-lined section T and travels in a direction of arrow V for receiving the electric power from the overhead line 8. Then, the dump truck 1 freely travels along the self-propelled section E2 and discharges the loads 50 by tilting the above-described vessel 5 using a hydraulic cylinder at an earth unloading area 52 which is a destination.

A central management control equipment 6 located in a remote place from the traveling path of the dump truck 1 includes a central control device 61 and a communication device 62. The central control device 61 is actuated by an operator and manages an operation status of the dump truck 1.

The communication device 62 performs a radio communication of radio wave W between the central control device 61 and the dump truck 1 to transmit and receive a variety of information. Thus, the dump truck 1 and the central management control equipment 6 act as a transport system. As a result, the operation status of the dump truck 1 is managed by the central management control equipment 6. This transport system can reduce operator personnel.

The control procedure illustrated in FIG. 7 will be described below. When the control device 4 obtains the position information from the vehicle body position measuring device 95, the obtained position information is transmitted to the central management control equipment 6 through the communication device 62 and the communication device 93. As a result, the central management control equipment 6 can obtain the operation status information of the dump truck 1. In addition, the transport system can deliver the map information, which is calculated by the central control device 61 of the central management control equipment 6 based on the operation status information of the dump truck 1, to the control device 4 of the dump truck 1 through the communication device 62 and the communication device 93.

The traveling path information generating unit 41 of the control device 4 generates traveling path information based on the map information which is obtained from the communication device 93 or stored previously (step S1). The traveling path information includes the map information and the information of the traveling path as a scheduled course along which the dump truck 1 travels. In addition, the traveling path information generates as the traveling path by attaching identification information of the overhead-lined section on which the overhead line 8 is laid and the self-propelled section on which the overhead line 8 is not laid to the map information. For example, the traveling path information is the information of the scheduled traveling path along which the dump truck 1 travels and in which the overhead-lined section T and the self-propelled sections E1 and E2 illustrated in FIG. 6 are identified.

The control device 4 stores the traveling path information in the memory. Next, the traveling control unit 42 of the control device 4 determines the moving direction or the speed based on the traveling path information and controls the motor 33 and the steering 36. When the control device 4 obtains the position information from the vehicle body position measuring device 95, the obtained position information is transmitted to the central management control equipment 6 through the communication device 62 and the communication device 93.

The control device 4 compares the traveling path information with the present position information of the dump truck 1 of the vehicle body position measuring device 95. When the control device 4 determines that the present position of the dump truck 1 is not in the overhead-lined section T (No in step S2), the pantograph control unit 43 controls the pantograph control actuator 74 to lower the pantograph 7 (step S3). As a result, the actuator 74 is contracted and retracted to be folded and is in a state in which the actuator is stored below the vessel 5.

The traveling control unit 42 controls the motor 33 and the steering 36 by the self-propelled driving source, based on the traveling path information. Thus, the dump truck 1 travels (step S4). When control device 4 obtains the position information from the vehicle body position measuring device 95, the obtained position information is transmitted to the central management control equipment 6 through the communication device 62 and the communication device 93.

When the control device 4 determines that the dump truck 1 does not reach the destination, for example, the earth unloading area 52 by comparing the traveling path information with the present position information of the dump truck 1 of the vehicle body position measuring device 95 (No in step S5), the procedure returns to step S2. The control device 4 causes the work of the dump truck 1 to be ended when determining that the dump truck 1 reaches the destination (Yes in step S5).

When the control device 4 determines that the present position of the dump truck 1 is in the overhead-lined section T (Yes in step S2), the control device confirms the position of the overhead line 8 by the pantograph position detector 91 (step S6).

Next, the traveling control unit 42 controls the steering 36 (step S7) and controls the traveling direction of the vehicle so that the pantograph 7 is placed below the overhead line 8. Then, the pantograph control unit 43 controls the pantograph control actuator 74 such that the pantograph 7 is raised (step S8) and the pantograph 7 stretches to be in the state capable of receiving the electric power from the overhead line 8. Accordingly the dump truck can receive the electric power from the overhead line 8 by stretching automatically the pantograph 7. The traveling control unit 42 performs trolley assist traveling which controls the motor 33 and the steering 36 by the electric power from the overhead line 8 based on the traveling path information (step S9).

Here, the control device 4 obtains a relative position between the pantograph 7 and the overhead line 8 from the pantograph position detector 91 and recognizes using an image. The traveling control unit 42 operates the steering 36 in a direction to reduce a deviation amount between the slider 71 of the pantograph 7 and the overhead line 8 such that the pantograph 7 seizes on the overhead line 8 and the pantograph 7 is not deviated from the overhead line 8. Thus, in the overhead-lined section T, the ratio that the pantograph 7 of the dump truck 1 seizes on the overhead line 8 increases and thus can inhibit the use of the self-propelled driving source. Furthermore, the operation of the steering 36 due to the above-described traveling control unit 42 may be performed at all times after the pantograph 7 seizes on the overhead line 8 and may also be performed at the time of exceeding the predetermined deviation amount which is previously set.

For example, the position of the overhead line 8 is substantially constant, but there is a concern that the position deviation of the overhead line 8 is generated by wind. The dump truck 1 takes the position deviation of the overhead line 8 as a relative position between the pantograph 7 and the overhead line 8, and the control device 4 modifies the steering 36 of the vehicle body 3, thereby correcting the position of the pantograph 7. As a result, the ratio that the pantograph 7 seizes on the overhead line 8 increases. Since the pantograph position detector 91 always recognizes the relative position between the pantograph 7 and the overhead line 8, the control device 4 can control the steering 36 so as to modify the relative position between the pantograph 7 and the overhead line 8, before the pantograph 7 hooks the overhead line 8.

In addition, the control device 4 continues the trolley assist traveling (step S9) when determining that the pantograph 7 seizes on the overhead line 8 (No in step S10).

The flowchart of FIG. 8 illustrates an example of the control procedure of the dump truck for illustrating step S10 in more detail. For example, the obstacle detector 92 detects the obstacle (step S101). The control device 4 transmits information on the obstacle to the central management control equipment 6 through the communication device 62 and the communication device 93. Here, FIG. 9 is an explanatory diagram illustrating an example of the traveling path information of the dump truck according to the present embodiment.

Figure 9:
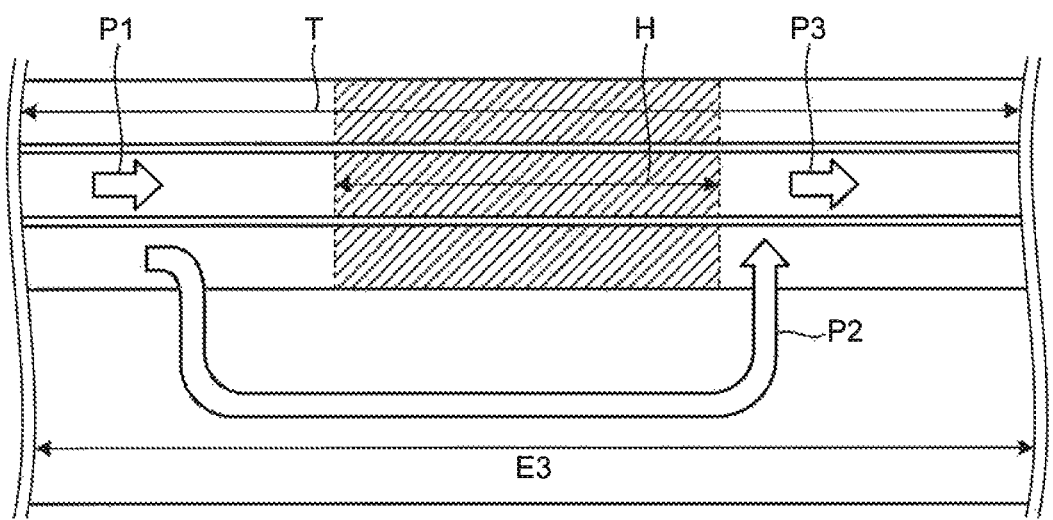
FIG. 9 is an explanatory diagram illustrating an example of travelling-path information of the dump truck according to the present embodiment.

In FIG. 9, for example, the dump truck 1 is scheduled to travel along the overhead-lined section T from a traveling position P1 to a traveling position P3 through a trouble-occurrence section H, in the traveling path information generated in step S1. The obstacle detector 92 detects the obstacle in the trouble-occurrence section H (step S101). When the control device 4 obtains the information on the obstacle, the obtained information is transmitted to the central management control equipment 6 through the communication device 62 and the communication device 93.

The control device 4 determines whether or not the detected obstacle is on the scheduled traveling course. When the control device 4 determines that the obstacle is not on the scheduled traveling course (No in step S102), the obstacle detector 92 continues the obstacle detection of step S101. When the control device 4 determines that the obstacle is on the scheduled traveling course (Yes in step S103), the control device 4 determines that the obstacle is present (Yes in step S103). As a result, the control device 4 determines that the pantograph 7 does not seize on the overhead line 8 (Yes in step S10), and thus the procedure proceeds to step S11. The control device 4 re-creates the traveling path information of a detour position P2 illustrated in FIG. 9 (step S11).

Alternatively, the central control device 61 determines that the obstacle is present (Yes in step S103) and may transmit the obstacle information to the dump truck 1. In this case, the control device 4 receives the obstacle information from the central control device 61 through the communication device 62 and the communication device 93 and determines that the pantograph 7 does not seize on the overhead line 8 (Yes in step S10), and thus the procedure proceeds to step S11.

Since the detour position P2 is a self-propelled section 53 without the overhead line 8, the control device 4 lowers the pantograph 7 (step S3). The pantograph control unit 43 controls the pantograph control actuator 74 to lower the pantograph 7 (step S3). As a result, the pantograph 7 is contracted and retracted to be folded and is in the state which is stored below the vessel 5. The traveling control unit 42 controls the motor 33 and the steering 36 by the self-propelled driving source based on the re-created traveling path information in step S11. Thus, the dump truck 1 travels (step S4). In this way, even though the dump truck 1 is the unmanned transport vehicle in which the vehicle body 3 has no cab, it can travel so that the pantograph 7 does not seize on the overhead line 8 while avoiding the obstacle at the same time. That is, the dump truck 1 can continuously travel even in a condition where the determination of the operator is absent. When the control device 4 obtains the position information from the vehicle body position measuring device 95, the obtained position information is transmitted to the central management control equipment 6 through the communication device 62 and the communication device 93.

The control device 4 compares the traveling path information with the present position information of the dump truck 1 of the vehicle body position measuring device 95. At this time, when the control device 4 determines that the dump truck 1 does not reach the destination, for example, the earth unloading area 52 (No in step S5), the procedure returns to step S2.

When the control device 4 obtains the traveling position P3 as the position information from the vehicle body position measuring device 95, the control device 4 determines that there is the overhead-lined section T by comparing the traveling path information with the traveling position P3 serving as the present position information (Yes in step S2). Then, the procedure repeats steps after step S6.

Figure 10:
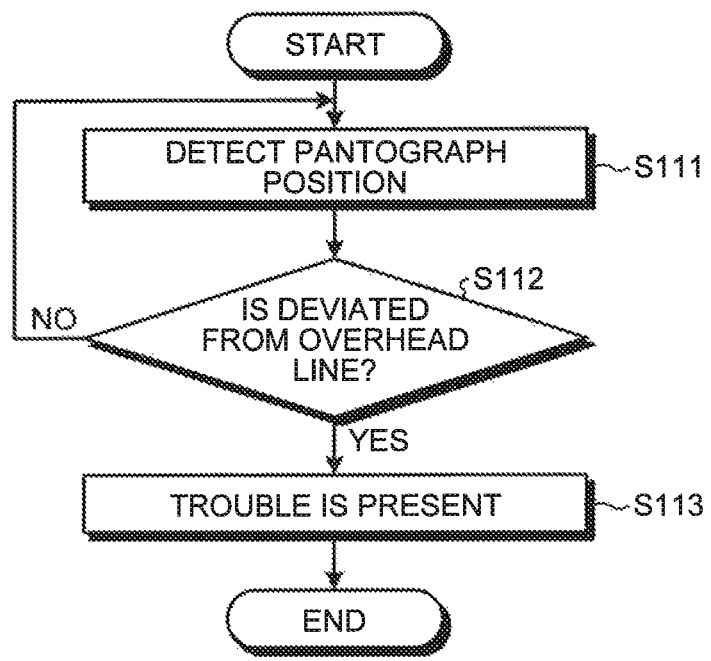
FIG. 10 is a flowchart illustrating another example of a control procedure of the dump truck according to the present embodiment.

FIG. 10 is a flowchart illustrating another example of the control procedure of the dump truck according to the present embodiment. The flowchart of FIG. 10 illustrates another example of the control procedure of the dump truck for illustrating step S10 in more detail. For example, the pantograph position detector 91 detects the position of the pantograph 7 (step S111). Thus, the connection state between the slider 71 of the pantograph 7 and the overhead line 8 is detected.

The control device 4 transmits the information on the connection state between the slider 71 of the pantograph 7 and the overhead line 8 to the central management control equipment 6 through the communication device 62 and the communication device 93. When the control device 4 determines that the connection state between the slider 71 of the pantograph 7 and the overhead line 8 is not deviated (No in step S112), through image analysis, the pantograph position detector 91 continues the position detection of the pantograph 7 of step S111.

When the control device 4 determines that the connection state between the slider 71 of the pantograph 7 and the overhead line 8 is deviated (Yes in step S112), through the image analysis, it is determined that the trouble is present (step S113). As a result, the control device 4 determines the pantograph 7 does not seize on the overhead line 8 (Yes in step S10), and thus the procedure proceeds to step S11. The control device 4 re-creates the traveling path information of the detour position P2 illustrated in FIG. 9 (step S11). Alternatively, the control device 4 re-creates the traveling path information by setting the trouble-occurrence section H illustrated in FIG. 9 as the self-propelled section (step S11).

When the control device 4 determines that the connection state between the slider 71 of the pantograph 7 and the overhead line 8 is deviated due to strong wind in the trouble-occurrence section H illustrated in FIG. 9 (Yes in step S112), it is determined that the trouble is present (step S113).

Alternatively, the central control device 61 may determine that the trouble is present (Yes in step S103) and transmit the obstacle information to the dump truck 1. In this case, the control device 4 receives the obstacle information from the central control device 61 through the communication device 62 and the communication device 93 and determines that the pantograph 7 does not seize on the overhead line 8 (Yes in step S10), and thus the procedure proceeds to step S11.

Next, the pantograph control unit 43 controls the pantograph control actuator 74 to lower the pantograph 7 (step S3). As a result, the pantograph 7 is contracted and retracted to be folded and is in the state which is stored below the vessel 5.

The traveling control unit 42 controls the motor 33 and the steering 36 by the self-propelled driving source, based on the traveling path information re-created in step S11. Thus, the dump truck 1 travels (step S4). In this way, even though the dump truck 1 is the unmanned transport vehicle in which the vehicle body 3 has no cab, it can travel while avoiding abnormity of the overhead line 8. That is, the dump truck 1 can continuously travel even in a condition where the determination of the operator is absent. When the control device 4 obtains the position information from the vehicle body position measuring device 95, the obtained position information is transmitted to the central management control equipment 6 through the communication device 62 and the communication device 93.

The control device 4 compares the traveling path information with the present position information of the dump truck 1 of the vehicle body position measuring device 95. At this time, when the control device 4 determines that the dump truck 1 does not reach the destination, for example, the earth unloading area 52 (No in step S5), the procedure returns to step S2.

When the control device 4 obtains the traveling position P3 as the position information from the vehicle body position measuring device 95, the control device 4 determines that there is the overhead-lined section T by comparing the traveling path information with the traveling position P3 serving as the present position information (Yes in step S2). Then, the procedure repeats steps after step S6. Moreover, the pantograph 7 may be stretched in such as a way of detecting the fact that the dump truck 1 has come under the overhead line 8 by the vehicle body position measuring device 95 such as GPS rather than by the pantograph position detector 91 serving as a pantograph position detecting unit. Further, the pantograph 7 may be stretched in such as a way that the dump truck 1 receives operation signal from the central control device 61. The above-described embodiment is described with respect to the dump truck 1 with no cab, but the dump truck may be an unmanned transport vehicle with a cab, and may be a manned dump truck which is a manned transport vehicle to be described later.

<Manned Dump Truck>

Figure 11:
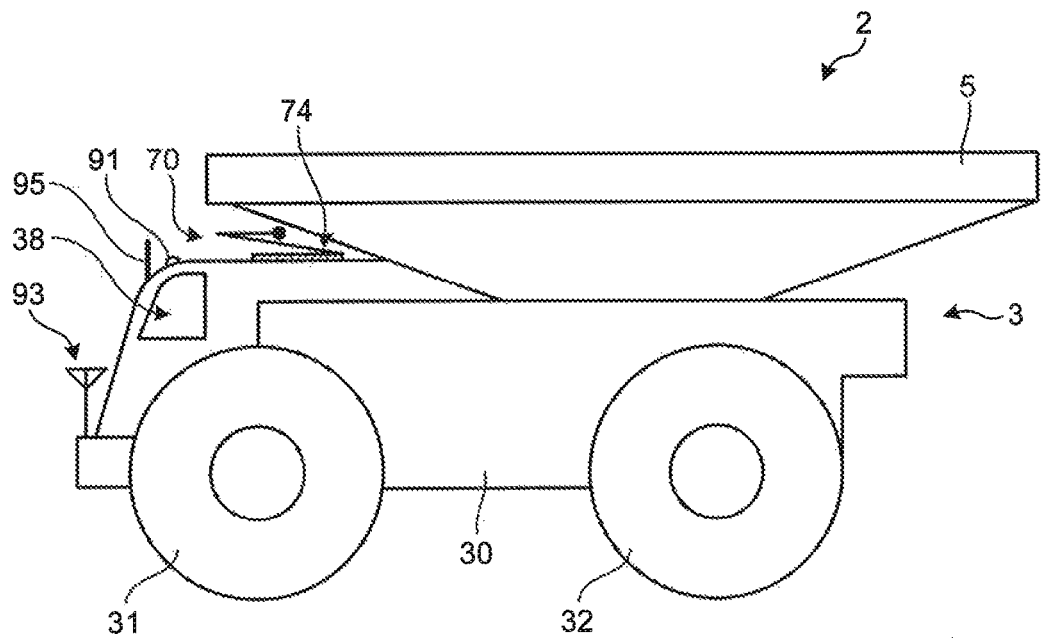
FIG. 11 is a side view illustrating the dump truck using the current collector according to the present embodiment.
Figure 12:
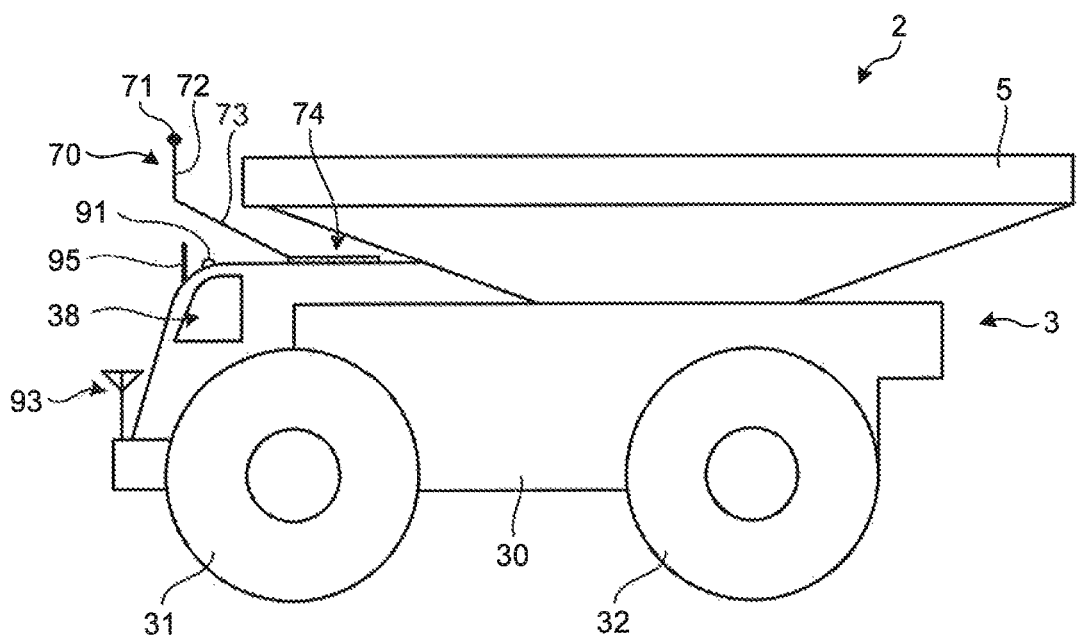
FIG. 12 is an explanatory diagram illustrating a stretched state of the current collector of FIG. 11.

FIG. 11 is a side view illustrating the dump truck using the current collector according to the present embodiment. FIG. 12 is an explanatory diagram illustrating a state in which the current collector of FIG. 11 is stretched. A dump truck 2 is a manned dump truck provided with the chassis 30 having a cab 38. Therefore, the vehicle body 3 of the dump truck 2 acts as a manned transport vehicle. The same reference numerals are denoted to the same members as those described above and a redundant description will be not presented. The dump truck 2 is used in a mine, for example.

A pantograph 70 is disposed above the cab 38 illustrated in FIG. 11. In addition, as illustrated in FIG. 12, the pantograph 70 is stretched by the operation of the pantograph control actuator 74 and then is capable of receiving the electric power from the overhead line 8. In addition, as illustrated in FIG. 11, the pantograph 70 is contracted and retracted to be folded by the operation of the pantograph control actuator 74 and then is stored below the vessel 5. The contracted and retracted pantograph 70 is disposed on the inner side in relation to the outline of the vessel 5 illustrated in FIG. 11 when viewed from the top. Thus, in a case of loading the loads on the vessel 5, the pantograph 7 is covered with the vessel 5, and thus it is possible to reduce the possibility that the damage of the pantograph 7 occurs due to the falling of loads from the vessel 5. In other words, the contracted and retracted pantograph 7 is in a state which is hidden in the vessel 5 when viewed from the top.

The pantograph 70 is arranged on at least the front side in the moving direction of the chassis 30. Further, more preferably, the pantograph 70 is also arranged on the rear side of the moving direction of the chassis 30. Thus, when the vehicle body 3 travels along the sloping road, it is possible to stretch the pantograph 70 of the inclined upper side of the sloping road and then to receive the electric power from the overhead line 8 without the operation of reversing the vehicle body 3. As a result, due to the inclining of the sloping road, even if the loads are fallen from the vessel 5, the possibility that the loads collide with the pantograph 70 is reduced. In addition, the dump truck 2 mostly runs on outdoors or parks in the outdoors. The dump truck 2 can inhibit effects caused by rain on the pantograph 70, since the contracted and retracted pantograph 70 is hidden in the vessel 5 when viewed from the top. As a result, the dump truck 2 can reduce the risk of trouble of the pantograph 70. Furthermore, the pantograph 70 may be disposed on at least one side of the vehicle body 3 in the direction perpendicular to the moving direction of the vehicle body 3, and preferably, may be disposed on both sides thereof, respectively.

Next, the procedure of the dump truck 2 will be described. The operator confirms the present position of the dump truck 2 and the position of the overhead line 8.

Next, the operator actuates the steering 36 and operates the vehicle so that the pantograph 7 is placed below the overhead line 8. Then, after the operator determines that the pantograph 70 is placed below the overhead line 8, the operator raises the pantograph 70 by actuating an operational switch of the pantograph control actuator 74 so that the pantograph 70 is stretched to be in the state capable of receiving the electric power from the overhead line 8. Moreover, as in the above-described dump truck 1, the pantograph 70 may be automatically stretched by the pantograph position detector 91 serving as the pantograph position detecting unit. Further, the pantograph 70 may be stretched in such as a way of detecting the fact that the dump truck 2 has come under the overhead line 8 by the vehicle body position measuring device 95 such as GPS. Further, the pantograph 70 may be stretched in such as a way that the dump truck 2 receives operation signal from the central control device 61.

Here, the control device 4 obtains the relative position between the slider 71 of the pantograph 70 and the overhead line 8 from the pantograph position detector and recognizes it using an image. The control device 4 instructs the information capable of recognizing the direction to actuate the steering to the operator of the cab so that the pantograph 70 seizes on the overhead line 8 and that the pantograph 70 is not deviated from the overhead line 8. Furthermore, the instruction may be performed at all times after the pantograph 70 is seized on the overhead line 8, or may also be performed at the time of exceeding the predetermined deviation amount which is previously set.

For example, the control device 4 instructs the direction to control the steering to the operator of the cab 38, using a sound or an arrow mark or character on the screen of a monitor (display unit) installed on the cab so that the pantograph 70 seizes on the overhead line 8 and that the pantograph 70 is not deviated from the overhead line 8. Thus, in the overhead-lined section T, the ratio that the pantograph 70 of the dump truck 1 seizes on the overhead line 8 increases and thus can inhibit the use of the self-propelled driving source. For example, the position of the overhead line 8 is substantially constant, but there is a concern that the position deviation of the overhead line B occurs by wind.

The position of the pantograph 70 is corrected in such a way that the dump truck 2 takes the position deviation of the overhead line 8 as the relative position between the pantograph 70 and the overhead line 8 and that the control device 4 instructs the traveling of the vehicle body 3. As a result, the ratio that the pantograph 70 seizes on the overhead line 8 increases. Since the pantograph position detector 91 recognizes the relative position between the pantograph 70 and the overhead line 8 at all times, before the pantograph 70 hooks the overhead line 8, the control device 4 can instruct the traveling so as to modify the relative position between the pantograph 70 and the overhead line 8. Furthermore, the control device 4 may instruct the traveling direction by displaying data (image) caught with the pantograph position detector 91 serving as the pantograph position detecting unit on the monitor (display unit) instead of the arrow mark or character. Even in this case, the operator can recognize the relative position between the pantograph 70 and the overhead line 8 from the information to be displayed on the screen to modify the position deviation.

As in the above-described dump truck 1, the vehicle body 3 of the dump truck 2 is provided with the obstacle detector 92 which detects the obstacle on the traveling path. In addition, the control device 4 may contract and retract the pantograph 70 serving as the current collector when the obstacle detector 92 detects the obstacle on the traveling path.

As in the above-described dump truck 1, the dump truck 2 is provided with the pantograph position detector 91. In addition, the control device 4 may contract and retract the pantograph 70 when the pantograph position detector 91 detects that the pantograph 70 is deviated from the overhead line 8.

In the dump truck 2, as in the above-described dump truck 1, when the overhead line 8 is present on the traveling path along which the vehicle body is going to travel, if the pantograph position detector 91 recognizes the relative position between the pantograph 70 and the overhead line 8, the control device 4 may allow the pantograph 70 to be stretched so as to receive the electric power from the overhead line 8. Thus, the dump truck 2 can automatically receive the electric power from the overhead line 8. As a result, the burden of the operator is alleviated.

REFERENCE SIGNS LIST 1, 2 Dump Truck
3 Vehicle Body
4 Control Device
5 Vessel
6 Central Management Control Equipment
7, 70 Pantograph (Current Collector)
8 Overhead Line
91 Pantograph Position Detector
92 Obstacle Detector

The invention claimed is:

1. A transport vehicle equipped with a current collector, comprising:
   a vessel to load a load;
   a current collector that extends to receive electric power from an overhead line disposed above the vessel and contracts and retracts so as to be disposed below the vessel; and
   a vehicle body that rotationally drives driving wheels by at least one of the electric power from the current collector and a self-propelled driving source, wherein the vessel is on the vehicle body,
   wherein the contracted and retracted current collector is disposed on an inner side of an outline of the vessel when viewed from a top side of the vessel, and the current collector is capable of retracting below the vessel and inside the outline of the vessel and extending above vessel while the vessel remains fixed relative to the vehicle body.

2. The transport vehicle equipped with the current collector according to claim 1, wherein the current collector includes a first current collector part disposed at a front side and a second current collector part disposed at a rear side opposite the front side in a moving direction of the vehicle body.

3. The transport vehicle equipped with the current collector according to claim 1, wherein the vehicle body is an unmanned transport vehicle without a cab.

4. The transport vehicle equipped with the current collector according to claim 1, wherein the current collector includes a slider that slidably comes in contact with the overhead line, a first arm to which the slider is attached, and a second arm that is connected with the first arm using a joint and is contracted and retracted to be folded so as to accommodate the first arm.

5. The transport vehicle equipped with the current collector according to claim 2, wherein when the transport vehicle travels along a sloped road and elevates one of the first and second current collector parts relative to the other of the first and second current collector parts, the one elevated current collector part is configured to extend to receive electric power from the overhead line while the other current collector part is retracted.

* * * * *